(12) United States Patent
Takasu et al.

(10) Patent No.: US 11,543,920 B2
(45) Date of Patent: Jan. 3, 2023

(54) INDICATOR DETECTION METHOD AND PROJECTION SYSTEM

(71) Applicant: SEIKO EPSON CORPORATION, Tokyo (JP)

(72) Inventors: Kazuhiro Takasu, Shiojiri (JP); Yukihiro Karasawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/706,875

(22) Filed: Mar. 29, 2022

(65) Prior Publication Data
US 2022/0317804 A1 Oct. 6, 2022

(30) Foreign Application Priority Data
Mar. 30, 2021 (JP) .............................. JP2021-056783

(51) Int. Cl.
*G06F 3/042* (2006.01)
*G06F 3/03* (2006.01)
*G06T 7/70* (2017.01)

(52) U.S. Cl.
CPC .......... *G06F 3/0425* (2013.01); *G06F 3/0308* (2013.01); *G06T 7/70* (2017.01)

(58) Field of Classification Search
CPC .... G06F 3/0425; G06F 3/0308; G06F 3/0386; G06T 7/70
See application file for complete search history.

(56) References Cited

U.S. PATENT DOCUMENTS

| | | | |
|---|---|---|---|
| 9,285,928 B2* | 3/2016 | Hsieh | G06F 3/042 |
| 9,582,119 B2* | 2/2017 | Lam | G06F 3/0354 |
| 10,275,097 B2* | 4/2019 | Tanaka | G06F 3/0425 |
| 10,397,534 B2* | 8/2019 | Chiba | G06T 5/006 |
| 10,521,050 B2* | 12/2019 | Kitani | G06F 3/0425 |
| 10,915,186 B2* | 2/2021 | Kitani | G06F 3/0386 |
| 2015/0204658 A1 | 7/2015 | Tamura | |
| 2017/0363937 A1 | 12/2017 | Imai | |

FOREIGN PATENT DOCUMENTS

| | | |
|---|---|---|
| JP | 2015-119454 A | 6/2015 |
| JP | 2015-158888 A | 9/2015 |
| JP | 2017-009829 A | 1/2017 |

* cited by examiner

*Primary Examiner* — Rodney Amadiz
(74) *Attorney, Agent, or Firm* — Oliff PLC

(57) ABSTRACT

An indicator detection method includes operating in a first mode and operating in a second mode. The first mode includes detecting a position of a first indicator on a operation surface by detecting first light emitted by the first indicator, emitting second light by a light emitting device, and detecting a position of a second indicator on the operation surface by detecting reflected light of the second light reflected by the second indicator. The second mode includes reducing a light amount of the second light when it is determined that the first indicator is in contact with the operation surface, and detecting the position of the first indicator on the operation surface by detecting the first light in a state where the light amount of the second light is reduced.

7 Claims, 9 Drawing Sheets

FIG. 4

| PHASE | FIRST STAGE | | | | SECOND STAGE | | | | THIRD STAGE | | | | FOURTH STAGE | | | | FIFTH STAGE | | | | SIXTH STAGE | | | |
|---|---|---|---|---|---|---|---|---|---|---|---|---|---|---|---|---|---|---|---|---|---|---|---|---|
| | 1A | 2 | 3 | 4 | 1B | 2 | 3 | 4 | 1A | 2 | 3 | 4 | 1B | 2 | 3 | 4 | 1A | 2 | 3 | 4 | 1B | 2 | 3 | 4 |
| LIGHT EMISSION PATTERN OF INDICATOR SIGNAL LIGHT WHEN NOT DRAWING IMAGE | 0 | 1 | 0 | 1 | 1 | 1 | 0 | 1 | 0 | 1 | 1 | 1 | 0 | 1 | 0 | 1 | 0 | 1 | 0 | 1 | 1 | 1 | 1 | 1 |
| LIGHT EMISSION PATTERN OF INDICATOR SIGNAL LIGHT WHEN DRAWING IMAGE | 0 | 1 | 0 | 1 | 1 | 1 | 1 | 1 | 0 | 1 | 1 | 1 | 0 | 1 | 0 | 1 | 0 | 1 | 1 | 1 | 0 | 1 | 1 | 1 |
| LIGHT EMISSION PATTERN OF EMISSION DETECTION LIGHT | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| LIGHT EMISSION PATTERN OF DEVICE SIGNAL LIGHT | 1 | 0 | 0 | 0 | 1 | 0 | 0 | 0 | 1 | 0 | 0 | 0 | 1 | 0 | 0 | 0 | 1 | 0 | 0 | 0 | 1 | 0 | 0 | 0 |

INDICATOR DETECTION METHOD AND PROJECTION SYSTEM

The present application is based on, and claims priority from JP Application Serial Number 2021-056783, Mar. 30, 2021, the disclosure of which is hereby incorporated by reference herein in its entirety.

BACKGROUND

1. Technical Field

The present disclosure relates to an indicator detection method and a projection system.

2. Related Art

In the related art, there is known a device that detects an indication position of an indicator by detecting reflected light of light emitted from a light emitting device, which is reflected by the indicator.

For example, in an image projection system disclosed in JP-A-2017-9829, infrared laser light shaped into a sheet shape from a laser light emitter propagates along a desk to form a light curtain. When a position on the desk is touched by an electronic pen, laser light is reflected at this position. The image projection system images the reflected light by an imager and detects a position of the electronic pen based on imaging data. In JP-A-2017-9829, when an obstacle on the desk is detected, a region on a projected image influenced by the obstacle is set to be excluded from a region where a operation with the electronic pen is validated. Accordingly, the influence of the obstacle blocking the laser light or the influence of the obstacle reflecting the laser light is restrained.

However, the operation with the electronic pen cannot be performed in a region excluded from the region where the operation with the electronic pen is validated. It may be required to detect a position of an indicator even in a region where an object other than the indicator is disposed.

SUMMARY

An aspect of the present disclosure is directed to an indicator detection method including: a first mode including detecting a position of a first indicator on a operation surface by detecting first light emitted by the first indicator, emitting second light by a light emitting device, and detecting a position of a second indicator on the operation surface by detecting reflected light of the second light reflected by the second indicator; and a second mode including reducing a light amount of the second light when it is determined that the first indicator is in contact with the operation surface, and detecting the position of the first indicator on the operation surface by detecting the first light in a state where the light amount of the second light is reduced.

Another aspect of the present disclosure is directed to a projection system including: a first indicator configured to emit first light; a light emitting device configured to emit second light; a controller configured to operate in a first mode and a second mode, the first mode including detecting a position of a first indicator on a operation surface by detecting the first light emitted by the first indicator, and detecting a position of a second indicator on the operation surface by detecting reflected light of the second light reflected by the second indicator, and the second mode including reducing a light amount of the second light when it is determined that the first indicator is in contact with the operation surface, and detecting the position of the first indicator on the operation surface by detecting the first light in a state where the light amount of the second light is reduced; and an optical device configured to project image light onto the operation surface based on the position of the first indicator or the position of the second indicator.

BRIEF DESCRIPTION OF THE DRAWINGS

FIG. 4 is a diagram showing light emission patterns of a first light transmitter and an emitter.

DESCRIPTION OF EXEMPLARY EMBODIMENTS

1. Configuration of Projection System 1

Figure 1:
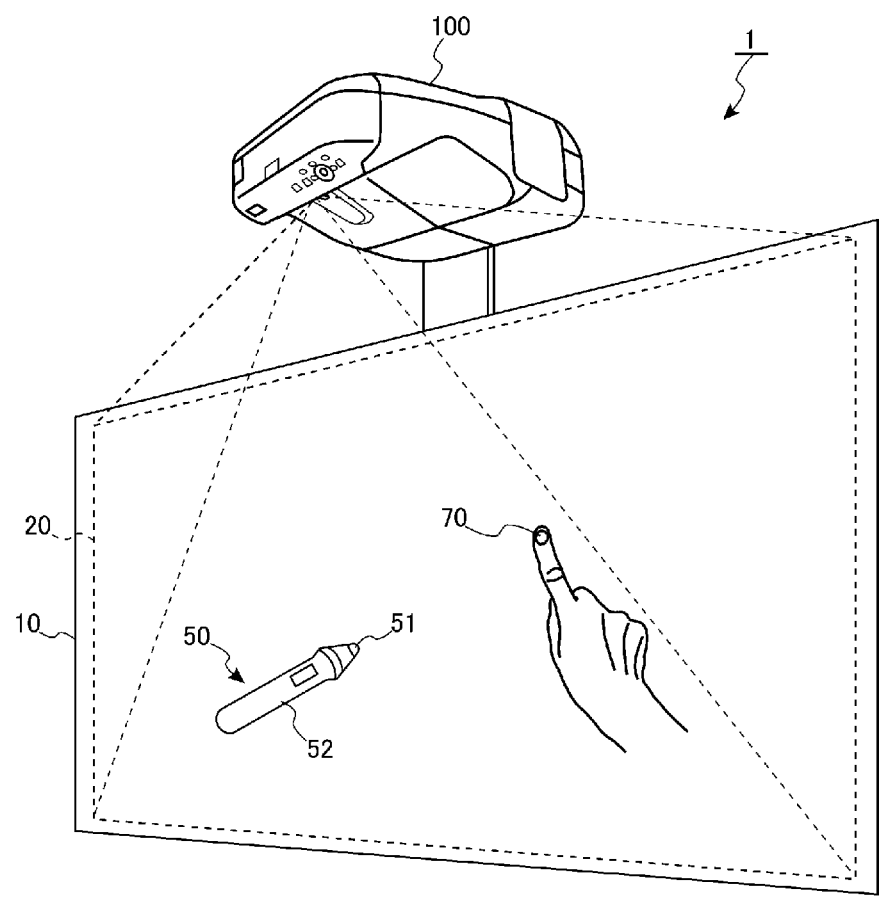
FIG. 1 is a perspective view showing a system configuration of a projection system.

FIG. 1 is a perspective view showing a system configuration of a projection system 1.

The projection system 1 includes a projector 100, a projection surface 10 on which the projector 100 projects an image, and a first indicator 50 used for designating a position on the projection surface 10. The position on the projection surface 10 can also be designated by a second indicator 70 such as a finger of a user. Hereinafter, description will be made by using a normal line of the projection surface 10 as a Z axis, using a vertical axis as a Y axis, and using an axis perpendicular to a Z-axis direction and a Y-axis direction as an X axis. The projection surface 10 corresponds to an example of a operation surface.

The projector 100 generates image light corresponding to image data, and projects the generated image light onto the projection surface 10. In addition, the projector 100 has an interactive function. The interactive function is a function of detecting the position on the projection surface 10 designated by the first indicator 50 and the second indicator 70, and displaying an image corresponding to a position or a locus of the first indicator 50 and the second indicator 70 based on the detected position or changing the displayed image.

The first indicator 50 is a pen-type indicator to be held in hand and used by the user, and includes a tip 51 capable of emitting light and a shaft 52 to be gripped by the user. A light source such as a light emitting diode (LED) configured to emit near-infrared light is mounted on the tip 51. The first indicator 50 emits light at predetermined light emission intervals in a touch state where the tip 51 is in contact with the projection surface 10. In addition, the first indicator 50 emits light at predetermined light emission intervals even in a state where the tip 51 is not in contact with the projection surface 10. In addition, although FIG. 1 shows one first indicator 50, the number of the first indicator 50 that can be used at the same time is not limited to one, and a plurality of first indicators 50 can be used at the same time.

Further, when the finger of the user is used as the second indicator 70, the user brings a tip such as a fingertip into contact with the projection surface 10 to designate the position on the projection surface 10.

The projector 100 emits detection light along the projection surface 10, and blocks the detection light when the tip of the second indicator 70 is in contact with the projection surface 10. This detection light is hereinafter referred to as second light 180. The second light 180 hits the second indicator 70 and is reflected, and a part of the reflected light of the second light 180 travels from the second indicator 70 toward the projector 100. The projector 100 detects reflected light of the second light 180 reflected by the second indicator 70, and detects a position designated by the second indicator 70.

Figure 2:
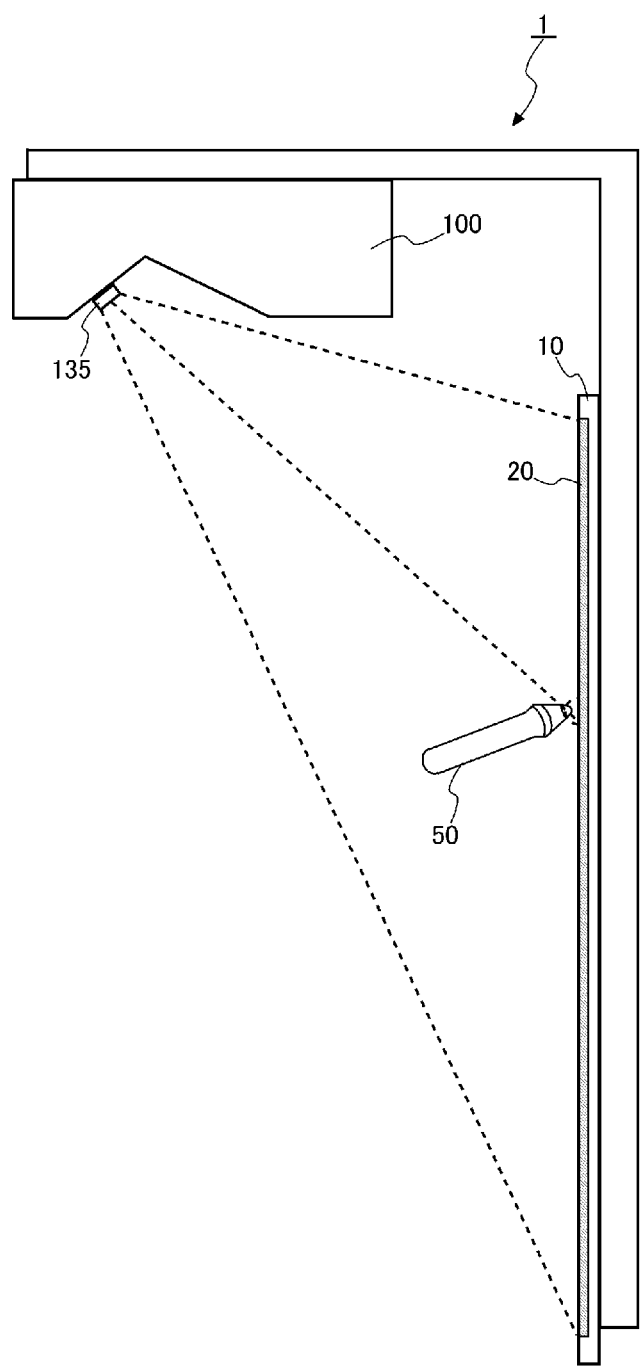
FIG. 2 is a side view of the projection system.

FIG. 2 is a side view of the projection system 1.

The projector 100 in the present embodiment is fixed to a wall surface and installed in front of and above the projection surface 10, and projects image light toward the projection surface 10 located diagonally below. A region of the projection surface 10 on which the image light is projected by the projector 100 is referred to as a projection region 20. In addition, the projector 100 emits, in a direction corresponding to the projection surface 10, the second light 180 used for detecting the first indicator 50 and the second indicator 70. Specifically, the direction is a direction in which the reflected light reflected by the second indicator 70, which approaches within a predetermined distance from the projection surface 10, can be incident on the imager 135. The second light 180 is light used for detecting the second indicator 70, and infrared light is used in the present embodiment. By using infrared light, the second indicator 70 can be detected without being influenced by image light mainly composed of visible light, and display by the image light is not affected. The second light 180 is emitted in a range including at least a part of the projection surface 10. In the present embodiment, the image light is projected in a range that covers the entire projection surface 10.

2. Configurations of Projector 100 and First Indicator 50

Figure 3:
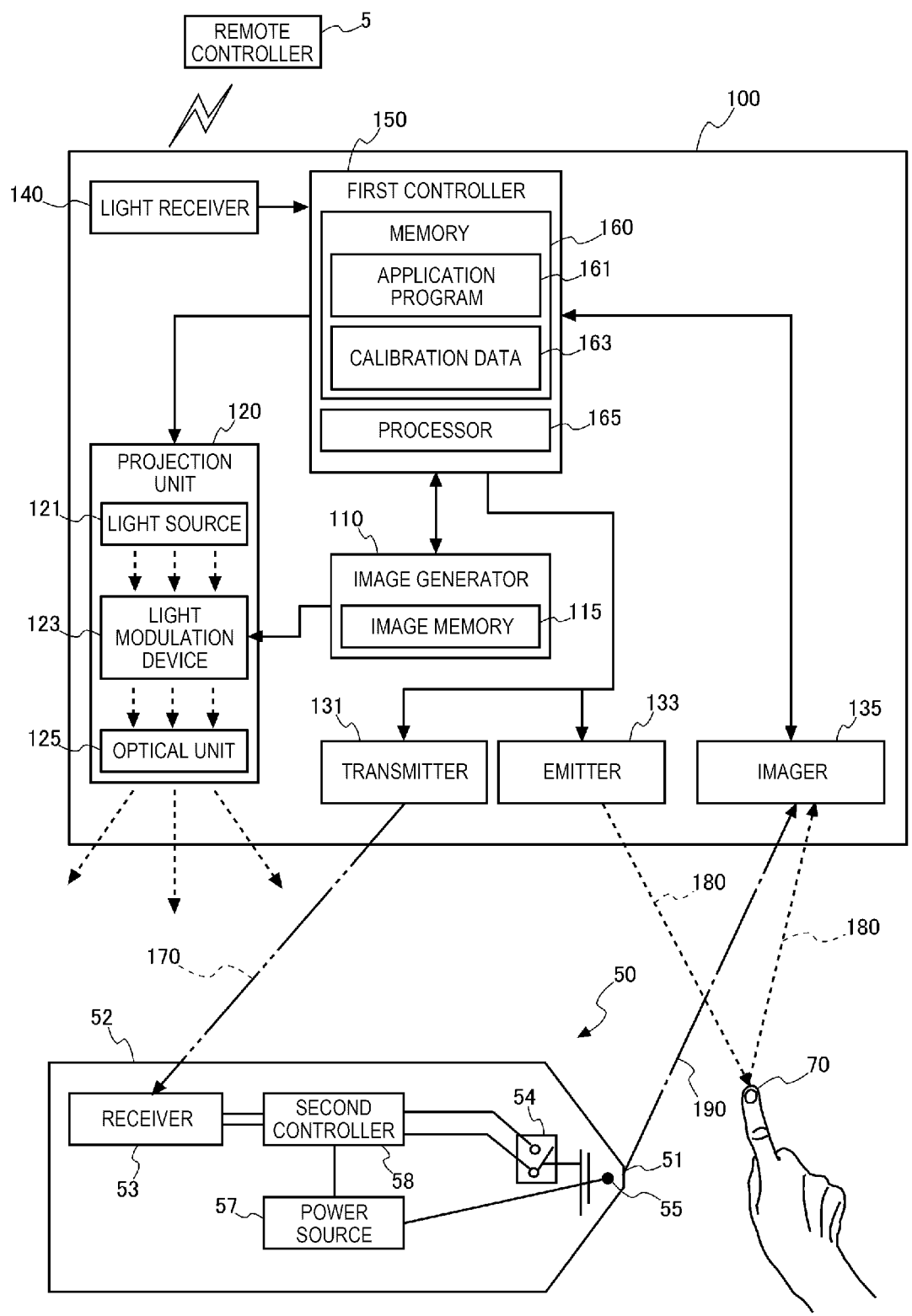
FIG. 3 is a configuration diagram showing configurations of a projector and a first indicator.

FIG. 3 is a configuration diagram showing configurations of the projector 100 and the first indicator 50. Firstly, the configuration of the projector 100 will be described.

The projector 100 includes an image generator 110, a projection unit 120, a transmitter 131, an emitter 133, the imager 135, a light receiver 140, and a first controller 150.

The image generator 110 is an arithmetic processing apparatus implemented by a central processing unit (CPU) or a graphics processing unit (GPU). The image generator 110 includes an image memory 115 configured to store a projected image. The image memory 115 is a so-called frame memory configured to store an image projected by the projection unit 120 in frame units.

The image generator 110 draws, in the image memory 115, a projected image projected on the projection surface 10, based on the image data. The image generator 110 outputs an image signal, indicating the image drawn in the image memory 115, to a light modulation device 123 described later, and projects, by the projection unit 120, image light corresponding to the image data onto the projection surface 10. The projection unit 120 corresponds to an optical device.

In addition, the image generator 110 executes image processing on the image drawn in the image memory 115. For example, the image generator 110 executes processing such as geometric correction processing of correcting trapezoidal distortion and the like of the projection region 20, digital zoom processing of enlarging or reducing a size of an image displayed on the projection surface 10, and color correction processing of correcting a color tone and the like of the image displayed on the projection surface 10.

The projection unit 120 includes a light source 121, the light modulation device 123, and an optical unit 125.

The light source 121 includes a light source such as a xenon lamp, an ultrahigh pressure mercury lamp, an LED, and a laser light source. In addition, the light source 121 may include a reflector and an auxiliary reflector that guide light emitted by the light source to the light modulation device 123.

The light modulation device 123 includes, for example, a modulation element such as a liquid crystal panel. The light modulation device 123 modulates light incident from the light source 121 according to an image signal received from the image memory 115 to form image light. The image light is typically color image light including visible light of three colors of red (R), green (G), and blue (B).

The optical unit 125 projects the image light formed by the light modulation device 123 onto the projection surface 10 to form an image on the projection surface 10. The optical unit 125 includes at least one of a lens and a mirror. The optical unit 125 may include a zoom mechanism configured to enlarge or reduce the image projected onto the projection surface 10 and a focus adjustment mechanism configured to adjust a focus.

The transmitter 131 outputs signal light 170, which is a signal for synchronizing a light emission timing of the first indicator 50 with an imaging timing of the imager 135. The signal light 170 is shown by a two-dot chain line in FIG. 3. The signal light 170 is a near-infrared-light signal that can be received by a receiver 53 described later in the first indicator 50. The transmitter 131 periodically transmits the signal light 170 while the projector 100 is starting up.

The signal light 170 is, for example, a control signal for designating a timing for causing the first indicator 50 to transmit first light 190. The first light 190 is near-infrared light having a predetermined light emission pattern. The first light 190 is shown by a one-dot chain line in FIG. 3. For example, the first indicator 50 transmits the first light 190 in synchronization with a timing at which the signal light 170 is received.

Therefore, the projector 100 makes it possible for the imager 135 to perform imaging in accordance with a timing at which the first indicator 50 emits the first light 190. The transmitter 131 includes, for example, a light source such as an LED, and a device configured to control on or off of the light source. The control device can be implemented by, for example, an application specific integrated circuit (ASIC), or a field-programmable gate array (FPGA).

The emitter 133 emits, in a direction including the projection surface 10, the second light 180 for detecting the first indicator 50 and the second indicator 70. The second light 180 is shown by a broken line in FIG. 3. The emitter 133 includes a laser diode (LD) or an LED as a light source that emits infrared light. In addition, the emitter 133 may include an optical component configured to diffuse, toward the projection surface 10, the infrared light emitted by the light source. The emitter 133 corresponds to an example of a light emitting device.

The imager 135 is a camera including an imaging element such as a complementary metal oxide semiconductor (CMOS) or a charge coupled device (CCD) configured to receive near-infrared light emitted by a light emitter 55 of the first indicator 50. In addition, the imager 135 includes an optical system configured to form an image on the imaging element and a diaphragm configured to limit light incident on the imaging element.

The imager 135 images a range including the projection surface 10 to generate an image. The imager 135 receives the first light 190 emitted by the first indicator 50 and generates an image. The image generated by the imager 135 is output to the first controller 150.

When performing imaging, the imager 135 outputs an interrupt signal to the first controller 150. When receiving a response corresponding to the interrupt signal from the first controller 150, the imager 135 outputs the image to the first controller 150.

The light receiver 140 receives an infrared signal transmitted from a remote controller 5. The light receiver 140 generates a operation signal corresponding to the received infrared signal, and outputs the generated operation signal to the first controller 150. The operation signal is a signal corresponding to a switch of the remote controller 5 operated by the user.

The first controller 150 is a computer device including a memory 160 and a processor 165. The memory 160 includes, for example, a volatile memory such as a random access memory (RAM) and a non-volatile memory such as a read only memory (ROM). The volatile memory implements a work area of the processor 165. The non-volatile memory stores calibration data 163, and a control program to be executed by the processor 165. The control program includes firmware and an application program 161.

The calibration data 163 is data in which the image and the projection region 20 of the projection surface 10 are associated with each other. More specifically, the calibration data 163 is data in which coordinates of each pixel in a coordinate system of the image and coordinates of each pixel in a coordinate system of the image memory 115 are associated with each other. The coordinates of this image are referred to as camera coordinates, and the coordinates of the image memory 115 are referred to as panel coordinates. By referring to the calibration data 163, a corresponding position in the projection region 20 is uniquely specified with respect to one position on the image.

The application program 161 is a program to be executed by the processor 165. The application program 161 is a program that implements the interactive function.

The processor 165 is implemented by, for example, a CPU or a microprocessor unit (MPU). Each part of the projector 100 is controlled by executing the control program by the processor 165. The first controller 150 may include a plurality of processors.

The first controller 150 detects the first light 190 imaged in the image, and reflected light of the second light 180 reflected by the first indicator 50. The first controller 150 analyzes the image generated by the imager 135 to specify indication positions of the first indicator 50 and the second indicator 70. The first controller 150 generates coordinate information indicating a position of a light spot of the detected first light 190 and a position of a light spot of the reflected light of the second light 180. This coordinate information is represented by the camera coordinates.

The first controller 150 converts the coordinate information represented by the camera coordinates into coordinate information of the panel coordinates. This conversion is performed, for example, based on the calibration data 163 generated by calibration performed in advance.

The first controller 150 controls each part of the projector 100 to display an image on the projection surface 10. In addition, drawing data representing an image, a figure, a character, a symbol, and the like corresponding to a locus of the position on the projection surface 10 designated by the first indicator 50 and the second indicator 70 is generated. The first controller 150 outputs the generated drawing data to the image generator 110. The first controller 150 controls the image generator 110 to expand the image data to coordinates on the image memory 115 based on the converted coordinate information. Accordingly, the drawing data is superimposed on the image data and an image thus obtained is displayed on the projection surface 10.

Next, a configuration of the first indicator 50 will be described.

The first indicator 50 includes the tip 51, the shaft 52, the receiver 53, a tip switch 54, the light emitter 55, a power source 57, and a second controller 58.

The receiver 53 includes a light receiving element configured to receive infrared light, and receives the signal light 170 transmitted by the projector 100. The receiver 53 outputs, to the second controller 58, a control signal indicating the timing at which the signal light 170 is received.

The tip switch 54 is a switch that is turned on when the tip 51 is in contact with the projection surface 10 and the tip 51 is pressed, and is turned off when the contact between the tip 51 and the projection surface 10 is released.

The light emitter 55 includes an LED configured to emit near-infrared light, and light emission thereof is controlled by the second controller 58, and in addition, the light emitter 55 outputs the first light 190, which is near-infrared light.

The power source 57 includes batteries such as a primary battery, a secondary battery, and a photovoltaic cell, and supplies power to each part of the first indicator 50. The first indicator 50 may include a power switch configured to turn on or turn off power supply from the power source 57.

The second controller 58 includes a processor such as a CPU, a storage device such as a memory, and various peripheral circuits. That is, the second controller 58 has a function as a computer. The second controller 58 controls each part of the first indicator 50 by the processor executing a program stored in the storage device. In addition, the second controller 58 may include a plurality of processors.

The second controller 58 determines, based on a control signal input from the receiver 53, a light emission timing for causing the light emitter 55 to emit light. The second controller 58 causes the light emitter 55 to emit light at a determined light emission timing, and outputs the first light 190.

3. Light Emission Patterns of First Indicator 50, Transmitter 131, and Emitter 133

FIG. 4 shows a light emission pattern of the first light 190 when not drawing an image, a light emission pattern of the first light 190 when drawing an image, a light emission pattern of the second light 180, and a light emission pattern of the signal light 170. "when not drawing an image" refers to a state where a tip of the first indicator 50 is not in contact with the projection surface 10, and the tip switch 54 is off. In addition, "when drawing an image" refers to a state where the tip of the first indicator 50 is in contact with the projection surface 10, and the tip switch 54 is on.

The first indicator 50 and the projector 100 repeatedly perform operations with four phases of a first phase, a second phase, a third phase, and a fourth phase as one cycle. Hereinafter, one cycle composed of four phases of the first phase, the second phase, the third phase, and the fourth phase is referred to as a stage. FIG. 4 shows six stages from a first stage to a sixth stage. "1A" or "1B" in each stage indicates the first phase. In addition, "2" in each stage indicates the second phase. Further, "3" in each stage indicates the third phase. Furthermore, "4" in each stage indicates the fourth phase.

The numerical value "1" shown in FIG. 4 indicates that the corresponding first indicator 50, transmitter 131, or emitter 133 is in an on state. In addition, the numerical value "0" shown in FIG. 4 indicates that the corresponding first indicator 50, transmitter 131, or emitter 133 is in an off state.

The first phase is a phase for synchronization and corresponds to a first period. In the first phase, the transmitter 131 of the projector 100 is turned on. When the transmitter 131 is turned on, the signal light 170, which is a synchronization signal, is output. A time length of each of the first phase to the fourth phase is preset, and the first indicator 50 specifies a start timing of each of the first phase to the fourth phase by receiving the signal light 170.

In addition, the first phase includes two phases of a first phase A and a first phase B. In the first phase, the first phase A and the first phase B are alternately repeated. "1A" shown in FIG. 4 corresponds to the first phase A, and "1B" shown in FIG. 4 corresponds to the first phase B. In addition, the first indicator 50 transmits, in the first phase, the first light 190 at a timing that does not overlap a timing at which the signal light 170 is output from the transmitter 131.

In addition, a signal, in which the first indicator 50 has a light emitting state inverse to that of the first indicator 50 in the third phase in a stage immediately before the current stage, is transmitted in the first phase B.

For example, since the first indicator 50 is on when not drawing an image and when drawing an image and a lighting state of the first indicator 50 in the third phase of the third stage is inverse to that in the first phase B of the fourth stage, the first indicator 50 is off when not drawing an image and when drawing an image. In addition, the lighting state of the first indicator 50 in the third phase of the fifth stage is off when not drawing an image, but is on when drawing an image. In the first phase B of the next sixth stage, conversely, the first indicator 50 is on when not drawing an image, and the first indicator 50 is off when drawing an image.

The second phase and the fourth phase are position detection phases. The second phase and the fourth phase correspond to a second period.

In the second phase and the fourth phase, the first indicator 50 and the emitter 133 are turned on. The first indicator 50 is on regardless of whether the tip switch 54 is on or off. The first light 190 is output by turning on the first indicator 50, and the second light 180 is output by turning on the emitter 133.

The projector 100 causes the imager 135 to perform imaging in accordance with the light emission timings of the first indicator 50 in the second phase and the fourth phase, and images the projection surface 10. An image including the light spot of the first light 190 when the first indicator 50 is on and the light spot of the reflected light of the second light 180 when drawing an image with the second indicator 70 is acquired. Accordingly, the position of the first indicator 50 and the position of the second indicator 70 are detected by the projector 100.

The third phase is a phase in which only the first indicator 50 is on, and corresponds to the first period. In addition, the third phase is a phase of identifying an individual of an indicator. Further, the third phase is a notification phase of notifying the projector 100 whether the tip switch 54 is on. In the third phase, the first indicator 50 emits light in a preset light emission pattern. The first indicator 50 switches the light emission pattern in the third phase depending on whether the tip switch 54 is on or off.

For example, it is assumed that "001" is set as the light emission pattern of the first indicator 50 in the third phase. This light emission pattern "001" is an indicator ID for identifying the first indicator 50, and is a light emission pattern unique to each first indicator 50. The first indicator 50 repeats the light emission pattern "001" in the third phases of three consecutive stages when not drawing an image. In an example shown in FIG. 4, in three consecutive stages of the first stage, the second stage, and the third stage, the first indicator 50 outputs the first light 190 in the light emission pattern "001". The projector 100 identifies an individual of the first indicator 50 by reading a repeated pattern based on the presence or absence of light emission in the third phase of a plurality of consecutive stages. The indicator ID may not be represented in three stages. For example, when two first indicators 50 of a first indicator 50A and a first indicator 50B are used, indicator IDs having different numbers of stages may be used, such as "001" for the first indicator 50A and "0001" for the first indicator 50B.

In addition, the first indicator 50 repeats a light emission pattern in which a light emission pattern representing an indicator ID is inverse to that in the third phase when drawing an image, that is, when the tip switch 54 is on. Therefore, when the indicator ID is "001", light is emitted in a light emission pattern "110" in the third phases of three consecutive stages. In the example shown in FIG. 4, in three consecutive stages of the first stage, the second stage, and the third stage, the first indicator 50 outputs the first light 190 in the light emission pattern "110".

The projector 100 causes the imager 135 to image the projection surface 10 in accordance with the light emission timing of the first indicator 50 in the third phase. An image including the light spot of the first light 190 when the first indicator 50 is on is acquired. Then, the projector 100 detects a touch state where the tip 51 of the first indicator 50 is in contact with a screen SS due to a light emission pattern when the tip switch 54 is on, and a hovering state where the tip 51 of the first indicator 50 is not in contact with the screen SS due to a light emission pattern when the tip switch 54 is off.

4. Operation of First Controller 150

The operation of the first controller 150 will be further described. When coordinate information is acquired in the second phase and the fourth phase, which are the position detection phases, in order to pass the acquired coordinate information to the application program 161, the first controller 150 temporarily stores the acquired coordinate information in the memory 160.

However, in the second phase and the fourth phase, the first controller 150 may not be able to acquire coordinate information of a light spot of the first indicator 50. For example, in order to draw a straight line on the projection surface 10 by the first indicator 50, it is assumed that an object is disposed at a position where the second light 180 emitted by the emitter 133 is reflected, such as bringing an object such as a ruler into contact with the projection surface 10.

As described above, in the second phase and the fourth phase, which are the position detection phases, the first indicator 50 outputs the first light 190, and the emitter 133 outputs the second light 180. Therefore, in a case of drawing an image by the first indicator 50 in the vicinity of the object such as a ruler, such as bringing the object into contact with the projection surface 10 and drawing a straight line by the first indicator 50, in the second phase and the fourth phase, the reflected light of the second light 180 output by the emitter 133 is reflected by the object, and the reflected light is detected by the first controller 150 as a light spot.

Therefore, the first light 190 output by the first indicator 50 may be buried in the reflected light of the second light 180. In such a case, it is difficult to specify the first light 190 from the reflected light of the second light 180 and to specify an indication position of the first indicator 50.

Therefore, when the first controller 150 cannot specify coordinate information of the first light 190 based on coordinate information in the second phase or the fourth phase, the first controller 150 temporarily stores, in the memory 160, coordinate information detected in the next third phase or the first phase. The first controller 150 passes the coordinate information detected in the third phase or the first phase to the application program 161.

In the first phase and the third phase, the emitter 133 does not output the second light 180. In addition, in the first phase B, the first indicator 50 is turned on in a light emission pattern which is inverse to a light emission pattern of the first indicator 50 in the third phase of the previous stage. In addition, the third phase is a phase in which only the first indicator 50 is turned on. Therefore, coordinate information of the detected light spot is not coordinate information of the light spot of the reflected light of the second light 180, but the coordinate information of the light spot of the first indicator 50.

In addition, in order to facilitate specification of the coordinate information of the first light 190 in the second phase and the fourth phase, when it is detected that the tip switch 54 is on, the first controller 150 causes the emitter 133 to reduce a light amount of the second light 180. The first controller 150 includes a first mode and a second mode as operation modes for controlling the light amount of the second light 180.

The first controller 150 does not cause the emitter 133 to reduce the light amount of the second light 180 when the operation mode is the first mode. The first controller 150 causes the emitter 133 to reduce the light amount of the second light 180 when the operation mode is the second mode. In the second mode, the first controller 150 reduces the light amount of the second light 180 to, for example, a light amount such that the reflected light of the second light 180 reflected by the second indicator 70 is not detected even if the image is analyzed.

In addition, reducing the light amount of the second light 180 by the first controller 150 includes stopping emitting the second light 180 by the emitter 133 when the operation mode shifts to the second mode. In the present embodiment, a case where the emitter 133 stops emitting the second light 180 when the operation mode shifts to the second mode will be described.

The projector 100 may accept a operation of selecting either the first mode or the second mode. For example, the first controller 150 may display, on the projection surface 10, a user interface image used for selecting an operation mode and may accept selection of the user. The user touches options displayed on the user interface image by using the first indicator 50 or the second indicator 70. The first controller 150 accepts the operation of the user based on a relationship between the coordinate information of the light spot and a display position of the user interface image, and operates in the selected operation mode. The options may be setting and canceling touch mute. The touch mute is a mode in which a operation with the second indicator 70 is muted, that is, the operation with the second indicator 70 is not detected. In addition, the first controller 150 may change the operation mode from the first mode to the second mode when the touch mute is selected by a operation with the remote controller 5. Further, the first controller 150 may change the operation mode from the second mode to the first mode when cancelling the touch mute is selected by the operation with the remote controller 5.

Figure 5:
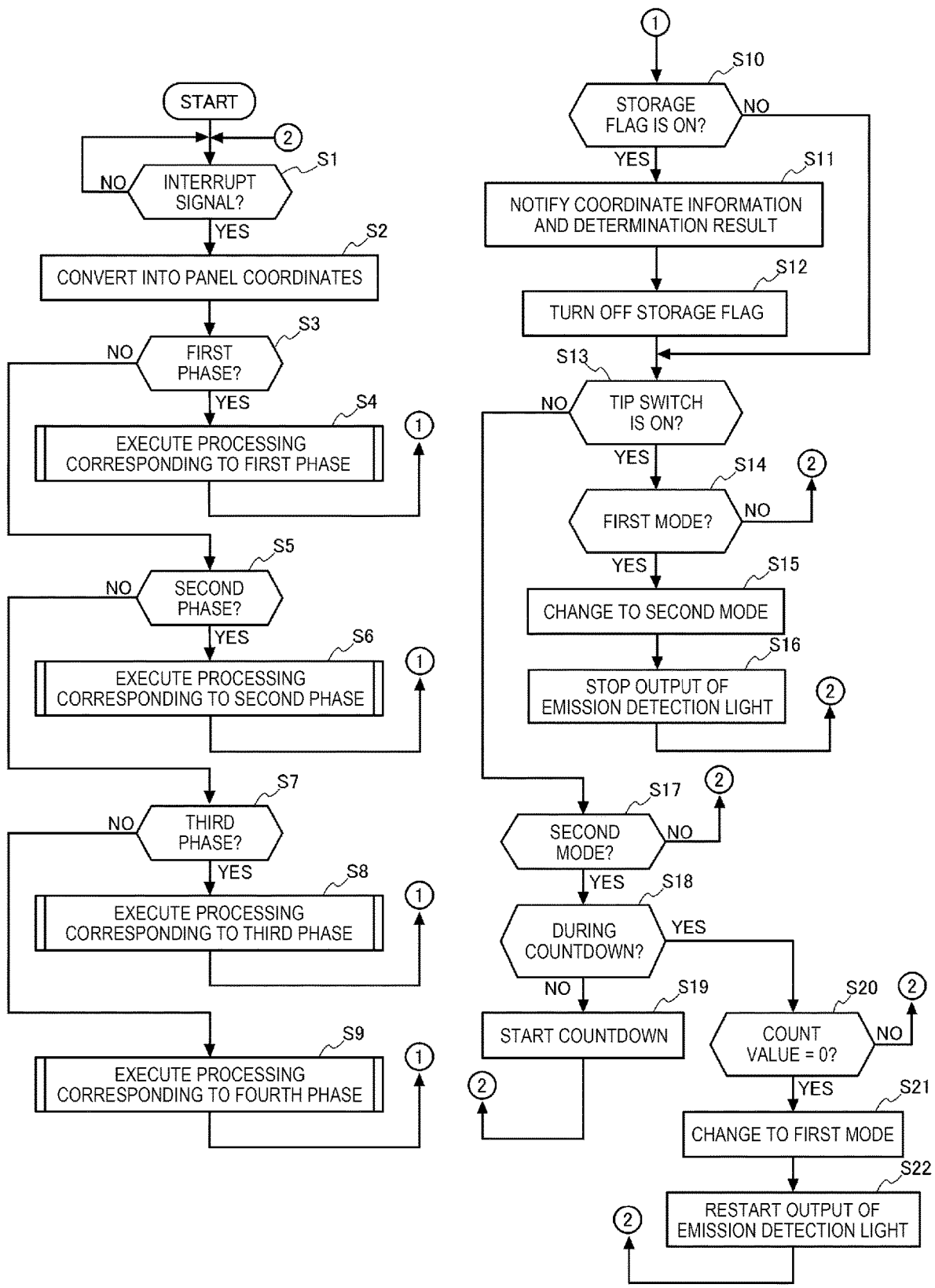
FIG. 5 is a flowchart showing operations of a first controller.

FIG. 5 is a flowchart showing operations of the first controller 150.

The operations of the first controller 150 will be described with reference to the flowchart shown in FIG. 5. Firstly, the first controller 150 determines whether an interrupt signal is input from the imager 135 (step S1). When the projection surface 10 is imaged and an image is generated, the imager 135 outputs the interrupt signal to the first controller 150. When the interrupt signal is not input from the imager 135, the first controller 150 waits for start of processing until the interrupt signal is input (step S1/NO).

When the interrupt signal is input from the imager 135 (step S1/YES), the first controller 150 acquires the image from the imager 135, analyzes the acquired image, and determines the presence or absence of a light spot. When the light spot is detected from the image, the first controller 150 specifies camera coordinates of the detected light spot. Subsequently, coordinate information of the camera coordinates is converted into coordinate information of panel coordinates by the calibration data 163 (step S2).

Next, the first controller 150 determines whether a phase in which the imaging is performed is the first phase (step S3). For example, the first controller 150 determines whether the phase in which the imaging is performed is the first phase based on an output timing of the signal light 170 and a timing of acquiring the image from the imager 135. When the first controller 150 determines that the phase in which the imaging is performed is the first phase (step S3/YES), the first controller 150 executes processing corresponding to the first phase (step S4). The details of the processing corresponding to the first phase will be described with reference to a flowchart shown in FIG. 6.

When the first controller 150 determines that the phase in which the imaging is performed is not the first phase (step S3/NO), the first controller 150 determines whether the phase in which the imaging is performed is the second phase (step S5). Also in this case, the first controller 150 determines whether the phase in which the imaging is performed is the second phase based on the output timing of the signal light 170 and the timing of acquiring the image from the imager 135. When the first controller 150 determines that the phase in which the imaging is performed is the second phase (step S5/YES), the first controller 150 executes processing corresponding to the second phase (step S6). The details of the processing corresponding to the second phase will be described with reference to a flowchart shown in FIG. 7.

When the first controller 150 determines that the phase in which the imaging is performed is not the second phase (step S5/NO), the first controller 150 determines whether the phase in which the imaging is performed is the third phase (step S7). Also in this case, the first controller 150 determines whether the phase in which the imaging is performed is the third phase based on the output timing of the signal light 170 and the timing of acquiring the image from the imager 135.

When the first controller 150 determines that the phase in which the imaging is performed is the third phase (step S7/YES), the first controller 150 executes processing corresponding to the third phase (step S8). The details of the processing corresponding to the third phase will be described with reference to a flowchart shown in FIG. 8.

When the first controller 150 determines that the phase in which the imaging is performed is not the third phase (step S7/NO), the first controller 150 executes processing corresponding to the fourth phase (step S9). The details of the processing corresponding to the fourth phase will be described with reference to a flowchart shown in FIG. 9.

When any one of step S4, step S6, step S8 and step S9 is executed, the first controller 150 subsequently determines whether the latest storage flag is on (step S10). A storage flag is a flag that is on when coordinate information is stored in the memory 160 in each step of step S4, step S6, step S8 and step S9. In the present embodiment, the storage flag is a bit string indicating whether the coordinate information is stored for each of a plurality of consecutive phases, and for each phase, "1" is set when the coordinate information is stored in the memory 160 and "0" is set when the coordinate information is not stored in the memory 160. In this specification, a case where the storage flag is "1" is referred to as on, and a case where the storage flag is "0" is referred to as off. The least significant bit of the storage flag is the latest storage flag.

When the first controller 150 determines that the latest storage flag is on (step S10/YES), the first controller 150 notifies the application program 161 of the latest coordinate information stored in the memory 160 and a determination result (step S11). Then, the first controller 150 changes the least significant storage flag to an off state (step S12). The first controller 150 turns off the least significant storage flag by shifting the storage flag to a higher order by 1 bit and setting a value of the least significant bit to "0". The determination result includes, for example, information indicating whether the tip switch 54 is on, information indicating the presence or absence of the detected light spot, information indicating whether the detected light spot is obtained by imaging the first light 190 or is obtained by imaging the reflected light of the second light 180, and information indicating the indicator ID. Processing of obtaining the determination result will be described later.

In addition, the first controller 150 determines whether the tip switch 54 is on when the first controller 150 determines that the latest storage flag is off (step S10/NO) or after processing in step S12 (step S13). The first controller 150 acquires, from the memory 160, a determination result of whether the tip switch 54 is on. The determination of whether the tip switch 54 is on is processing executed in step S9.

When the determination result is that the tip switch 54 is on (step S13/YES), the first controller 150 determines whether the current operation mode is the first mode (step S14). When the first control unit 150 determines that the operation mode is not the first mode but the second mode (step S14/NO), the processing returns to step S1.

In addition, when the first controller 150 determines that the current operation mode is the first mode (step S14/YES), the first controller 150 changes the operation mode to the second mode (step S15), and causes the emitter 133 to stop output of the second light 180 (step S16). Then, the first controller 150 returns to the determination in step S1.

Further, when the first control unit 150 determines in step S13 that the tip switch 54 is off (step S13/NO), the first controller 150 determines whether the current operation mode is the second mode (step S17). When the first control unit 150 determines that the current operation mode is not the second mode but the first mode (step S17/NO), the first controller 150 returns to the determination in step S1.

Furthermore, when the first controller 150 determines that the current operation mode is the second mode (step S17/YES), the first controller 150 determines whether a counter is during countdown (step S18). When the first controller 150 determines that the counter is not during countdown (step S18/NO), the first controller 150 sets a predetermined value in the counter and starts the countdown (step S19). Then, the first controller 150 returns to the determination in step S1.

In addition, when the first controller 150 determines in the determination of step S18 that the counter is during countdown (step S18/YES), the first controller 150 determines whether a count value of the counter is 0 (step S20). When the first controller 150 determines that the count value of the counter is not 0 (step S20/NO), the first controller 150 returns to the determination in step S1. Further, when the first controller 150 determines that the count value of the counter is 0 (step S20/YES), the first controller 150 changes the operation mode from the second mode to the first mode (step S21). Then, the first controller 150 causes the emitter 133 to restart the output of the second light 180 (step S22), and returns to the determination in step S1. That is, when a state where drawing is not performed continues for a predetermined time in a case where the first controller 150 is operating in the second mode, the projector 100 changes the operation mode to the first mode and restarts the detection of the indication position of the second indicator 70.

Figure 6:
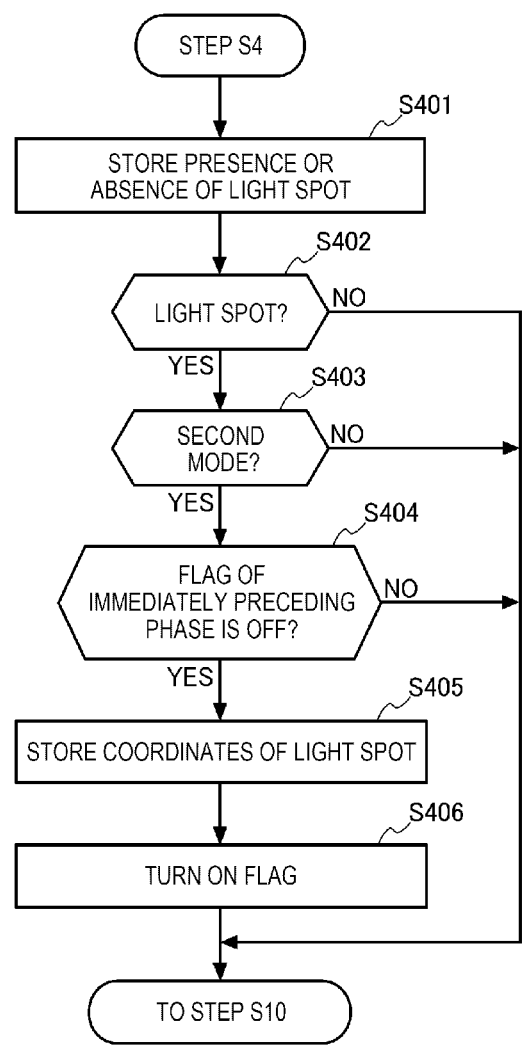
FIG. 6 is a flowchart showing operations of the first controller in a first phase.

Subsequently, step S4, step S6, step S8 and step S9 will be described. FIG. 6 is the flowchart showing details of step S4 shown in FIG. 5, that is, the operations of the first controller 150 in the first phase.

The first controller 150 stores, in the memory 160, the presence or absence of the light spot detected in the current first phase (step S401). When the coordinate information of the panel coordinates of the light spot is acquired in step S2, and the coordinate information determined to be the light spot of the first indicator 50 within the latest predetermined period is stored in the memory 160, the first controller 150 compares the latest coordinate information with the current coordinate information. As a result of the comparison, when current coordinates are within a predetermined range with respect to coordinates as a comparison target, it is determined that the light spot is detected, and information indicating that the light spot is present is stored in the memory 160. When the current coordinates are not within the predetermined range, it is determined that the light spot is not detected, and information indicating that the light spot is not present is stored in the memory 160. When the coordinate information of the panel coordinates of the light spot is acquired in step S2 and coordinate information as the comparison target is not present, information indicating that the light spot is present is stored in the memory 160 assuming that the current light spot is not noise. In addition, when the light spot is not detected in step S2, the first controller 150 stores, in the memory 160, the information indicating that the light spot is not present. A determination result of the presence or absence of the light spot includes information indicating the presence or absence of the light spot for a predetermined number of consecutive phases.

Next, the first controller 150 determines whether the light spot detected in the current first phase is present with reference to the determination result stored in step S401 (step S402).

When the first controller 150 determines that the light spot is not present (step S402/NO), the processing proceeds to step S10. Further, when the first controller 150 determines that the light spot is present (step S402/YES), the first controller 150 determines whether the current operation mode is the second mode (step S403). When the first controller 150 determines that the current operation mode is not the second mode but the first mode (step S403/NO), the processing proceeds to step S10. When the first controller 150 determines that the current operation mode is the second mode (step S403/YES), the first controller 150 determines whether a storage flag of the immediately preceding phase is off (step S404). Since the immediately preceding phase is the fourth phase of the immediately preceding stage, in the first phase, the first controller 150 determines whether the storage flag of the fourth phase is off. When the storage flag is on, the first controller 150 determines that the storage flag is not off (step S404/NO), and the processing proceeds to step S10.

When the first controller 150 determines that the storage flag is off (step S404/YES), the first controller 150 temporarily stores, in the memory 160, coordinate information of the light spot detected in the current first phase (step S405). In order to output, to the application program 161, the coordinate information of the light spot detected in the first phase, the first controller 150 temporarily stores the coordinate information in the memory 160. Then, the first controller 150 changes the least significant bit of the storage flag from the off state to the on state (step S406). Then, the processing proceeds to step S10.

Figure 7:
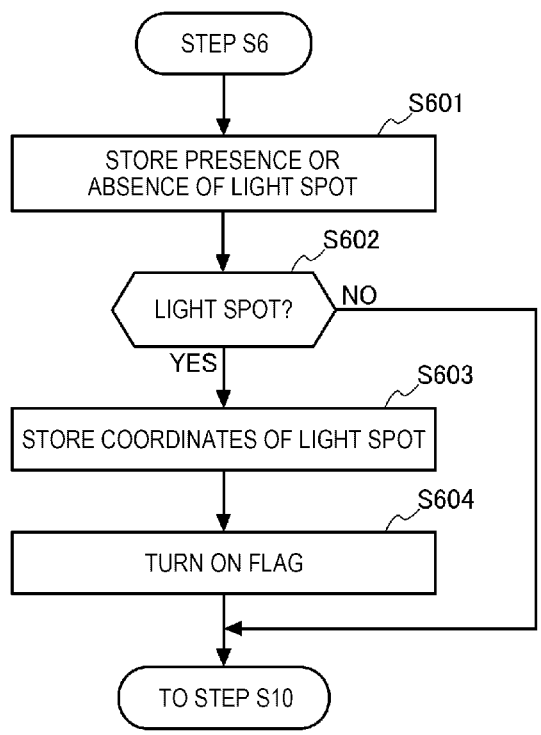
FIG. 7 is a flowchart showing operations of the first controller in a second phase.

FIG. 7 is the flowchart showing details of step S6 shown in FIG. 5, that is, the operations of the first controller 150 in the second phase.

The first controller 150 stores, in the memory 160, the presence or absence of the light spot detected in the current second phase (step S601). A method of determining the presence or absence of the light spot is the same as in step S402. However, in the second phase, the first light 190 and the reflected light of the second light 180 can be detected. Therefore, the first controller 150 compares coordinates of the light spot detected in the second phase with coordinates of a comparison target determined to be the light spot of the first light 190, and coordinates of a comparison target determined to be the light spot of the reflected light of the second light 180. Then, the first controller 150 determines that the current light spot within a predetermined range from both of the coordinates is the light spot of the first light 190 or the light spot of the reflected light of the second light 180. When no light spot is detected or when the first controller 150 determines that the detected light spot is not within a predetermined range from both the first light 190 and the reflected light of the second light 180, the first controller 150 stores, in the memory 160, information indicating that no light spot is present.

Subsequently, the first controller 150 determines whether the light spot detected in the current second phase is present with reference to the determination result stored in step S601 (step S602). When the first controller 150 determines that the light spot is not present (step S602/NO), the processing proceeds to step S10. When the first controller 150 determines that the light spot is present (step S602/YES), the first controller 150 stores panel coordinates of the light spot in the memory 160 (step S603). Then, the first controller 150 changes the least significant bit of the storage flag from the off state to the on state (step S604). Then, the processing proceeds to step S10.

Figure 8:
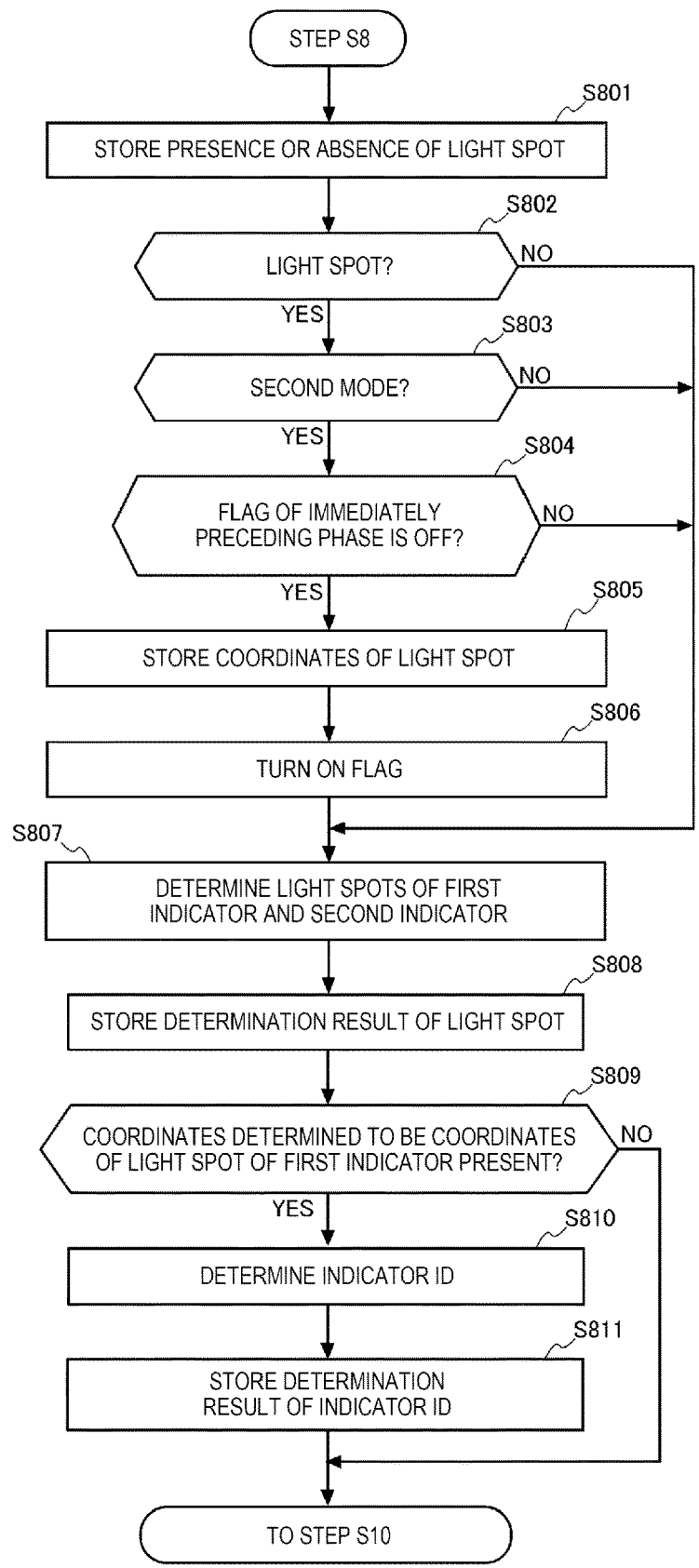
FIG. 8 is a flowchart showing operations of the first controller in a third phase.

FIG. 8 is the flowchart showing details of step S8 shown in FIG. 5, that is, the operations of the first controller 150 in the third phase.

The first controller 150 stores, in the memory 160, the presence or absence of the light spot detected in the current third phase (step S801). Processing in step S801 is the same as that in step S401.

Next, the first controller 150 determines whether the light spot detected in the current third phase is present with reference to the determination result stored in step S801 (step S802). When the first controller 150 determines that the light spot is not present (step S802/NO), the processing proceeds to step S807.

Further, when the first controller 150 determines that the light spot is present (step S802/YES), the first controller 150 determines whether the current operation mode is the second mode (step S803). When the first controller 150 determines that the current operation mode is not the second mode but the first mode (step S803/NO), the processing proceeds to step S807. When the first controller 150 determines that the current operation mode is the second mode (step S803/YES), the first controller 150 determines whether a storage flag of the immediately preceding phase is off (step S804). Since the immediately preceding phase is the second phase of the current stage, in the third phase, the first controller 150 determines whether the storage flag of the second phase is off. When the storage flag is on, the first controller 150 determines that the storage flag is not off (step S804/NO), and the processing proceeds to step S807.

When the first controller 150 determines that the storage flag is off (step S804/YES), the first controller 150 stores, in the memory 160, coordinate information of the light spot detected in the current third phase (step S805). Then, the first controller 150 changes the least significant bit of the storage flag from the off state to the on state (step S806).

Next, the first controller 150 determines light spots of the first indicator 50 and the second indicator 70 (step S807). The first controller 150 determines, as coordinates of the light spot of the first indicator 50, coordinates in which a light spot is detected in the second phase and the fourth phase, and a light spot is detected in the first phase or the third phase. In addition, the first controller 150 determines, as coordinates of the light spot of the second indicator 70, coordinates in which a light spot is detected in the second phase and the fourth phase, and a light spot is not detected in the third phase.

The first controller 150 stores the determination result in the memory 160 (step S808). The first controller 150 associates coordinate information of the light spot with information indicating whether an indicator is the first indicator 50 or the second indicator 70, and stores the associated information in the memory 160.

Next, in step S809, the first controller 150 determines whether there are coordinates determined to be the coordinates of the light spot of the first indicator 50, with reference to the information stored in the memory 160 (step S809). When the first controller 150 determines that there are no coordinates determined to be the coordinates of the light spot of the first indicator 50 (step S809/NO), the processing proceeds to step S10. In addition, when there are coordinates determined to be the coordinates of the light spot of the first indicator 50 (step S809/YES), the first controller 150 determines the indicator ID set to the first indicator 50 (step S810).

The first controller 150 determines the indicator ID set to the first indicator 50 based on a result of detecting the light spot in the past third phase from the coordinates determined to be the coordinates of the light spot of the first indicator 50. For example, when the tip switch 54 is on, the first controller 150 determines a light emission pattern for one first indicator 50 by acquiring information on whether light is emitted at the same coordinates in the third phases of three consecutive stages, with reference to the determination result stored in step S801 and the determination result stored in step S808. For example, when the light emission pattern matches any of a plurality of indicator IDs previously stored in the memory 160, the first controller 150 determines that the indicator ID is the indicator ID of the first indicator 50. For example, when the light emission pattern is "001" and matches the stored indicator ID, the first controller 150 determines that the indicator ID is the coordinates of the light spot of the first indicator 50 of "001".

In addition, when the light emission pattern is inverse to any of the indicator IDs previously stored, the first controller 150 determines that an inversion of the light emission pattern is the indicator ID of the first indicator 50. For example, when the light emission pattern is "110", the first controller 150 determines that the indicator ID is the coordinates of the light spot of the first indicator 50 of "001".

When the indicator ID of the first indicator 50 can be determined, the first controller 150 stores the determined indicator ID in the memory 160 in association with coordinate information. In addition, when the indicator ID cannot be determined, the first controller 150 stores information that the determination is not possible in the memory 160 in association with coordinate information (step S811). Then, the processing proceeds to step S10.

Figure 9:
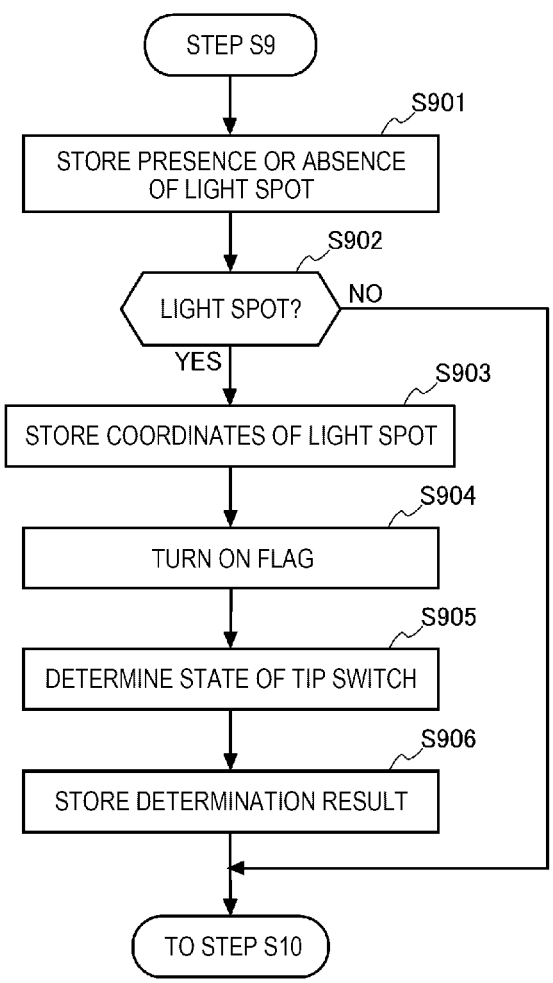
FIG. 9 is a flowchart showing operations of the first controller in a fourth phase.

FIG. 9 is the flowchart showing details of step S9 shown in FIG. 5, that is, the operations of the first controller 150 in the fourth phase.

The first controller 150 stores, in the memory 160, the presence or absence of the light spot detected in the current fourth phase (step S901). A method of determining the presence or absence of the light spot is the same as in step S601. Subsequently, the first controller 150 determines whether the light spot detected in the current fourth phase is present with reference to the determination result stored in step S901 (step S902). When the first controller 150 determines that the light spot is not present (step S902/NO), the processing proceeds to step S10. When the first controller 150 determines that the light spot is present (step S902/YES), the first controller 150 stores panel coordinates of the light spot in the memory 160 (step S903). Subsequently, the first controller 150 changes the least significant bit of the storage flag from the off state to the on state (step S904).

When the storage flag is changed to the on state, the first controller 150 determines whether the tip switch 54 is on or off (step S905). When the light emission pattern obtained in step S810 matches the indicator ID, the first controller 150 determines that the tip switch 54 is off. In addition, when the light emission pattern matches the inversion of the indicator ID, the first controller 150 determines that the tip switch 54 is on. The first controller 150 stores the determination result of the state of the tip switch 54 in the memory 160 (step S906). Then, the processing proceeds to step S10.

As described above, the projector 100 in the present embodiment includes the first controller 150 that executes the first mode and the second mode.

When the first mode is executed, the first controller 150 detects the position of the first indicator 50 on the projection surface 10 by detecting the first light 190 emitted by the first indicator 50, emits the second light 180 by the emitter 133, and detects the position of the second indicator 70 on the projection surface 10 by detecting the reflected light of the second light 180 reflected by the second indicator 70.

In addition, when the second mode is executed, the first controller 150 reduces the light amount of the second light 180 when it is determined that the first indicator 50 is in contact with the projection surface 10, and detects the position of the first indicator 50 on the projection surface 10 by detecting the first light 190 in a state where the light amount of the second light 180 is reduced.

Therefore, when it is determined that the first indicator 50 is in contact with the projection surface 10, the light amount of the second light 180 used for detecting the position of the second indicator 70 is reduced, so that the first light 190 emitted by the first indicator 50 is easier to be detected. Therefore, a decrease in detection accuracy of the operation with the first indicator 50 can be prevented.

When the light amount of the second light 180 is reduced, the first controller 150 causes the emitter 133 to stop emitting the second light 180.

Therefore, the first light 190 emitted by the first indicator 50 is further easier to be detected.

When the light amount of the second light 180 is reduced, the first controller 150 reduces the light amount of the second light 180 to a light amount such that the reflected light is not detected.

Therefore, when it is determined that the first indicator 50 is in contact with the projection surface 10, the light amount of the second light 180 is reduced to a light amount such that the reflected light reflected by the second indicator 70 cannot be detected, so that the first light 190 emitted by the first indicator 50 is easier to be detected. Therefore, a decrease in detection accuracy of the operation with the first indicator 50 can be prevented.

The first controller 150 accepts the operation of selecting either the first mode or the second mode.

Therefore, a mode of the first controller 150 can be switched to the first mode or the second mode by the operation of the user. Thus, by manually changing the mode to the second mode according to user decision, the first light 190 emitted by the first indicator 50 can be easily detected.

The light emission patterns of the first indicator 50 and the emitter 133 include the first period and the second period.

The first period is the first phase or the third phase in which the first indicator 50 emits the first light 190 and the emitter 133 stops emitting the second light 180.

In addition, the second period is the second phase and the fourth phase in which the first indicator 50 emits the first light 190 and the emitter 133 emits the second light 180 in the first mode.

The first controller 150 determines whether the first light 190 is detected in the first phase or the third phase.

Detecting the position of the first indicator 50 means to output the position of the first indicator 50 based on a position of the light detected in the second phase or the fourth phase when it is determined that the first indicator 50 is detected in the second phase or the fourth phase.

Therefore, in the first mode, when the first light 190 is detected in the second phase or the fourth phase, the position of the first indicator 50 is output based on the position of the light detected in the second phase or the fourth phase, so that the position of the first indicator 50 can be detected.

In addition, detecting the position of the first indicator 50 includes outputting, by the first controller 150, the position of the first indicator 50 based on a position of the first light 190 detected in the first phase or the third phase.

Therefore, in the second mode, the position of the first indicator 50 is output based on the position of the first light 190 detected in the first phase or the third phase in which the second light 180 is not emitted, so that the accuracy of detecting the position of the first indicator 50 can be improved.

The projection system 1 includes: the first indicator 50 configured to emit the first light 190; the emitter 133 configured to emit the second light 180; the first controller 150 configured to operate in the first mode and the second mode, the first mode including detecting the position of the first indicator 50 on the projection surface 10 by detecting the first light 190 emitted by the first indicator 50, and detecting the position of the second indicator 70 on the projection surface 10 by detecting the reflected light of the second light 180 reflected by the second indicator 70, and the second mode including reducing the light amount of the second light 180 when it is determined that the first indicator 50 is in contact with the projection surface 10, and detecting the position of the first indicator 50 on the projection surface 10 by detecting the first light 190 in a state where the light amount of the second light 180 is reduced; and an optical device configured to project image light onto the projection surface 10 based on the position of the first indicator 50 or the position of the second indicator 70.

Therefore, when the first indicator 50 is in contact with the projection surface 10, the light amount of the second light 180 used for detecting the position of the second indicator 70 is reduced, so that the first light 190 emitted by the first indicator 50 is easier to be detected. Therefore, a decrease in detection accuracy of the operation with the first indicator 50 can be prevented.

The embodiment described above is a preferred embodiment of the present disclosure. However, the present disclosure is not limited to this embodiment, and various modifications can be made without departing from the scope of the present disclosure.

For example, in the embodiment described above, a configuration in which the projector 100 includes the emitter 133 and the imager 135 has been described. Alternatively, at least one of the emitter 133 and the imager 135 may be provided outside the projector 100 as a separate light emitting device. In addition, a part of functions of the first controller 150 may be provided on a separate device provided outside the projector 100. When these configurations are provided outside the projector 100, these configurations may be independent devices or a device including two or more of these configurations.

In addition, in the embodiment described above, the projector 100 has been described as a liquid crystal projector using a transmissive liquid crystal panel. Alternatively, the projector 100 may be a projector using a reflective liquid crystal panel or a digital mirror device.

Further, each function of the first indicator 50 shown in FIG. 3 shows a functional configuration implemented by cooperation of hardware and software, and a specific implementation is not particularly limited. Therefore, it is not always necessary to implement hardware individually corresponding to each function, and it is of course possible to be a configuration in which functions of a plurality of function parts are implemented by executing a program by one processor. Furthermore, in the embodiment described above, apart of functions implemented by software may be implemented by hardware, and a part of functions implemented by hardware may be implemented by software.

In addition, for example, in the configuration of the first indicator 50 shown in FIG. 3, at least a part of the receiver 53, the second controller 58, the power source 57, and the tip switch 54 may be implemented by an integrated circuit or other digital circuits, and at least a part of each part may include an analog circuit. The integrated circuit includes large scale integration (LSI), ASIC, and programmable logic device (PLD). The PLD includes, for example, an FPGA. Each part may be a combination of a processor and an integrated circuit. The combination is referred to as, for example, a micro control unit (MCU), a system-on-a-Chip (SoC), a system LSI, and a chipset.

In addition, in the configuration of the projector 100 shown in FIG. 3, at least a part of the transmitter 131, the emitter 133, and the first controller 150 may be implemented by an integrated circuit IC or other digital circuits, and at least a part of each part may include an analog circuit. Further, each part may be implemented by a combination of a processor and an integrated circuit.

Furthermore, in order to implement the indicator detection method described above, each part also may be implemented in the form of a program executed by a computer, a recording medium on which this program is recorded by the computer and is readable for the computer, or a transmission medium configured to transmit this program.

In addition, processing units of the flowcharts shown in FIG. 5 to FIG. 9 are divided according to main processing contents in order to facilitate understanding of processing of the first controller 150, and the present disclosure is not limited by a method or a name of division of the processing units shown in the flowcharts of FIG. 5 to FIG. 9. Further, the processing of the first controller 150 can also be divided into more processing units depending on processing contents, and can also be divided such that one processing unit includes more processing. Furthermore, processing order of the flowcharts is not limited to the illustrated example.

What is claimed is:

1. An indicator detection method, comprising:
    operating in a first mode including
        detecting a position of a first indicator on a operation surface by detecting first light emitted by the first indicator,
        emitting second light by a light emitting device, and
        detecting a position of a second indicator on the operation surface by detecting reflected light of the second light reflected by the second indicator; and
    operating in a second mode including
        reducing a light amount of the second light when it is determined that the first indicator is in contact with the operation surface, and
        detecting the position of the first indicator on the operation surface by detecting the first light in a state where the light amount of the second light is reduced.

2. The indicator detection method according to claim 1, wherein reducing the light amount of the second light is stopping emitting the second light.

3. The indicator detection method according to claim 1, wherein reducing the light amount of the second light is reducing the light amount of the second light to a light amount that the reflected light is not detected.

4. The indicator detection method according to claim 1, further comprising:
    receiving a operation of selecting either the first mode or the second mode.

5. The indicator detection method according to claim 1, further comprising:
    during a first period, emitting the first light by the first indicator and stopping emitting the second light by the light emitting device;
    during a second period, emitting the first light by the first indicator and emitting the second light by the light emitting device in the first mode; and
    determining whether the first light is detected during the first period, wherein
    detecting the position of the first indicator in the first mode includes outputting the position of the first indicator based on a position of light detected during the second period when it is determined that the first light is detected.

6. The indicator detection method according to claim 5, wherein detecting the position of the first indicator in the second mode includes outputting the position of the first indicator based on a position of the first light detected during the first period.

7. A projection system, comprising:
a first indicator which emits first light;
a light emitting device which emits second light;
at least one processor controller programmed to operate in a first mode and a second mode,
the first mode including
   detecting a position of a first indicator on a operation surface by detecting the first light emitted by the first indicator, and
   detecting a position of a second indicator on the operation surface by detecting reflected light of the second light reflected by the second indicator, and
the second mode including
   reducing a light amount of the second light when it is determined that the first indicator is in contact with the operation surface, and
   detecting the position of the first indicator on the operation surface by detecting the first light in a state where the light amount of the second light is reduced; and
an optical device which projects image light onto the operation surface based on the position of the first indicator or the position of the second indicator.

* * * * *